(12) United States Patent
Schulze et al.

(10) Patent No.: US 6,464,818 B1
(45) Date of Patent: Oct. 15, 2002

(54) METHOD OF WASTELESS PUNCHING OF ADHESIVE PUNCHED ITEMS

(75) Inventors: Reiner Schulze; Dieter Tichelmann, both of Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/469,683

(22) Filed: Dec. 22, 1999

Related U.S. Application Data

(63) Continuation-in-part of application No. 08/935,484, filed on Sep. 24, 1997, now abandoned.

(30) Foreign Application Priority Data

Oct. 4, 1996 (DE) .......................................... 196 41 094

(51) Int. Cl.[7] .............................. B32B 31/10; B26F 1/38
(52) U.S. Cl. ........................ 156/249; 156/248; 156/265; 156/270
(58) Field of Search ................................. 156/247, 248, 156/249, 264, 265, 269, 270

(56) References Cited

U.S. PATENT DOCUMENTS

| | | | |
|---|---|---|---|
| 3,457,137 A | * | 7/1969 | McCarthy |
| 3,892,901 A | * | 7/1975 | Smith |
| 4,475,969 A | * | 10/1984 | Reed |
| 5,167,752 A | * | 12/1992 | Dowling |
| 5,681,413 A | * | 10/1997 | Hille et al. |
| 5,725,717 A | * | 3/1998 | Harte et al. |
| 5,891,290 A | * | 4/1999 | Deurer et al. |
| 6,059,913 A | * | 5/2000 | Asmussen et al. |

FOREIGN PATENT DOCUMENTS

DE 196 41 094 * 6/1997

* cited by examiner

Primary Examiner—Curtis Mayes
(74) Attorney, Agent, or Firm—Norris McLaughlin & Marcus

(57) ABSTRACT

A process for the wasteless punching of adhesive punched items, wherein the items are punched from a continuous web on a first release laminate and then peeled off of said first laminate and reattached to a faster moving second laminate, the distance between the point where the punched items are released from the first release laminate and the point where they become attached to the second release laminate being greater than the width of the individual punched items.

8 Claims, 4 Drawing Sheets

METHOD OF WASTELESS PUNCHING OF ADHESIVE PUNCHED ITEMS

This application is a continuation-in-part of application Ser. No. 08/935,484 filed Sep. 24, 1997, now abandoned.

The invention relates to the wasteless punching of adhesive punched items from a continuous web which is covered on at least one side with a release laminate.

BACKGROUND OF THE INVENTION

The mode of preparing adhesive punched items which is known from the prior art takes place by means of so-called screen punching. In this technique a continuous web which consists of the material that is to be punched and is covered in most cases on at least one side with a release laminate has a screen punched into it. The punching process can take place, for example, rotationally in the cutting line between a cutting roller and a counter-roller.

Following the removal of the punched screen, the individual punched items remain on the release laminate in the web. The width of the screen bridge should be chosen so as to rule out contact between the individual punched items, in order to prevent the punched items from sticking to one another again subsequently. Such sticking occurs in the case, in particular, of punched items comprising a flowable, adhesive material.

This method is used in particular in the production of labels. It is also used to process webs which consist of a double-sided self-adhesive film. The adhesive film in this case is based on thermoplastic rubber and tackifying resins, and is of high elasticity and low plasticity. The punched items resulting from the punching process are obtainable commercially, inter alia, under the name "PosterStrips"® from Beiersdorf.

However, the process described is hampered by a large number of disadvantages. The punched screen, which depending on the material may have a significant bridge width, is not available for further processing. In the majority of cases, therefore, it ends up in the waste.

This entails a not inconsiderable loss of material, which in some cases is equivalent to the amounts of material processed overall in the punched items produced. From a business standpoint this is highly unsatisfactory. Furthermore, such a loss should be avoided purely on ecological grounds.

DE 35 11 717 C2 describes a process by means of which it is possible to produce a backing tape which carries removable self-adhesive labels. For this purpose, double-sided self-adhesive film webs or paper webs are applied to the backing tape. This backing tape is passed into a punching tool in which the upper and lower film or paper webs are punched simultaneously and congruently over one another. However, even this type of punching is possible only by means of a punched screen which after punching is peeled off from the backing tape.

The object of the invention was therefore to provide a method which adhesive items can be punched from a continuous web without a punched screen, i.e. without waste.

SUMMARY OF THE INVENTION

This object is achieved by a method of wasteless punching of adhesive punched items from a continuous web which is covered on at least one side with a release laminate, wherein a) the web is passed into a punching device, the individual contours of the punched items being punched through in the web, without a punched screen, in the cutting line of the punching device, b) directly after the punching operation, the release laminate is peeled off by means of a dispensing edge with a small radius of deflection, c) subsequently, the individual punched items are applied to a second release laminate which has a higher belt speed than the first release laminate, the distance between the dispensing edge and the beginning of the second release laminate being equal to or greater than the width of said punched items, as a result of which there is separation of the punched items on the second release laminate.

The invention relates accordingly to a method of wasteless punching of adhesive punched items from a continuous web which is covered on at least one side with a release laminate.

DETAILED DESCRIPTION

In the first step of the method the web is passed into a punching device, the individual contours of the punched items being punched through in the web, without a punched screen, in the cutting line of the punching device.

In the second step of the method, directly after the punching operation, the release laminate is peeled off by means of a dispensing edge with a small radius of deflection.

Subsequently, in the third step of the method, the individual punched items are applied to a second release laminate which has a higher belt speed than the first release laminate, as a result of which there is separation of the punched items on the second release laminate.

The chosen belt speed of the second release laminate should always be greater than that of the first release laminate.

The difference in speed between the first release laminate and the second release laminate at the same time defines the spacing with which the individual punched items are set down on the second release laminate: the higher the difference in speed, the greater the spacing.

In accordance with the invention, the distance between the point where the individual punched item becomes fully detached from the first release laminate and the point where it makes contact with the second release laminate, is equal to or greater than the width of the punched item itself. The individual punched items thus become fully-detached from the first release laminate before becoming attached to the second release laminate, and at one point is thus attached to neither. This makes it possible to avoid damage to the punched item, where it might otherwise occur due to the differences in the speeds of the first release laminate and the second release laminate.

The punching device is advantageously formed from a rotary cutting roller and a co-rotating counter-roller, the web being passed into the gap between the cutting roller and the counter-roller, and the release laminate being passed by way of the counter-roller. In the gap, then, the individual contours of the punched items are punched through in the web without a punched screen.

Preferably, furthermore, the punching device consists of a lift punch into which the web is passed. A buffer can be provided behind the lift punch in order to ensure the continuous progression of the method. In this case the second step of the method takes place directly after the buffer.

In a further advantageous embodiment of the method, the punched items are applied to the second release laminate in a gap between two co-rotating rollers, thereby ensuring the controlled guidance of the punched items. Within the gap, furthermore, a certain pressing pressure is obtained, with which the punched items are pressed onto the second release laminate, thereby ensuring the bonding of the punched items to the release laminate.

The web is preferably narrower than the first release laminate and/or the second release laminate.

The method can be employed with particular advantage if the web is formed from a double-sided self-adhesive film which is based on thermoplastic rubber and tackifying resins, has high elasticity and low plasticity and is elastically or plastically extendable with or without an intermediate backing. An adhesive film of this kind sticks in particular to the upper and to the lower sides, but the cut edges formed by punching also stick. Consequently, if the web were punched without waste using prior art methods, it could not be stored for very long without the individual punched items sticking to one another again, which makes subsequent separation difficult if not impossible.

The method is also outstandingly suitable for the punching of labels. Using this method, the labels can be punched from a single-sided adhesive web. This web can be formed from coating material, for example beam-cured coating material, or from a multi-film laminate. One example of such a laminate is the coffee bag valve required for the packaging of coffee.

Another factor unforeseeable to the skilled worker is that the method of the invention allows a substantially higher belt speed than is the case in the customary screen punching of elastically or plastically extendable materials, which are often very sensitive and tend to tear; the hitherto unavoidable risk of the screen tearing during its removal at high belt speeds does not occur in the method according to the invention. Thus a fourfold increase in speed in the case of adhesive films based on thermoplastic rubber and tackifying resins, of high elasticity and low plasticity, is readily possible.

Continuous operation of the method is not mandatory. Rather, the method can also be carried out in numerous individual steps, the steps of the method being operated synchronously and then stopped again. This mode of operation is particularly appropriate when using a lift punch.

The method also has other economic and ecological advantages. For one, the first release laminate, whose function is in principle merely that of an intermediate backing, can be employed a number of times in the method before tears appear. The punched contours which occur in this release laminate are amenable to multiple recycling.

Furthermore the second release laminate can also be recycled if it is likewise wound up following removal of the punched items. No traces whatsoever of the punching process are evident in this release laminate, and so it can be employed a number of times.

Especially in connection with the punching of labels, the lack of partial punching of the release laminate is found to be highly advantageous. In the case of the industrial utilization of the labels, the second release laminate is often used for mechanically dispensing the label as well. At very high speeds and with the associated high stresses on the release laminate, a partially punched release laminate is found to have inadequate load-bearing capacity. The release laminate tears, leading to a time-consuming interruption of the otherwise continuous process. Such weakening of the release laminate is not observed with the method according to the invention.

In the text below the method will be illustrated by reference to a number of Figures, with no restriction whatsoever being intended.

BRIEF DESCRIPTION OF DRAWINGS

As shown in FIG. 1 the continuous web 1 is passed at a speed of, for example, 30 m/min into the cutting line 21 between the cutting roller 2 and the co-rotating counter-roller 3. The web I consists of a double-sided self-adhesive film based on the thermoplastic rubber and tackifying resins. This adhesive film is covered on both the upper and the lower side with a release laminate in the form of a release film 11, which is guided by way of the counter-roller 3. The release film 11 is advantageously wider than the web 1.

Figure 1:
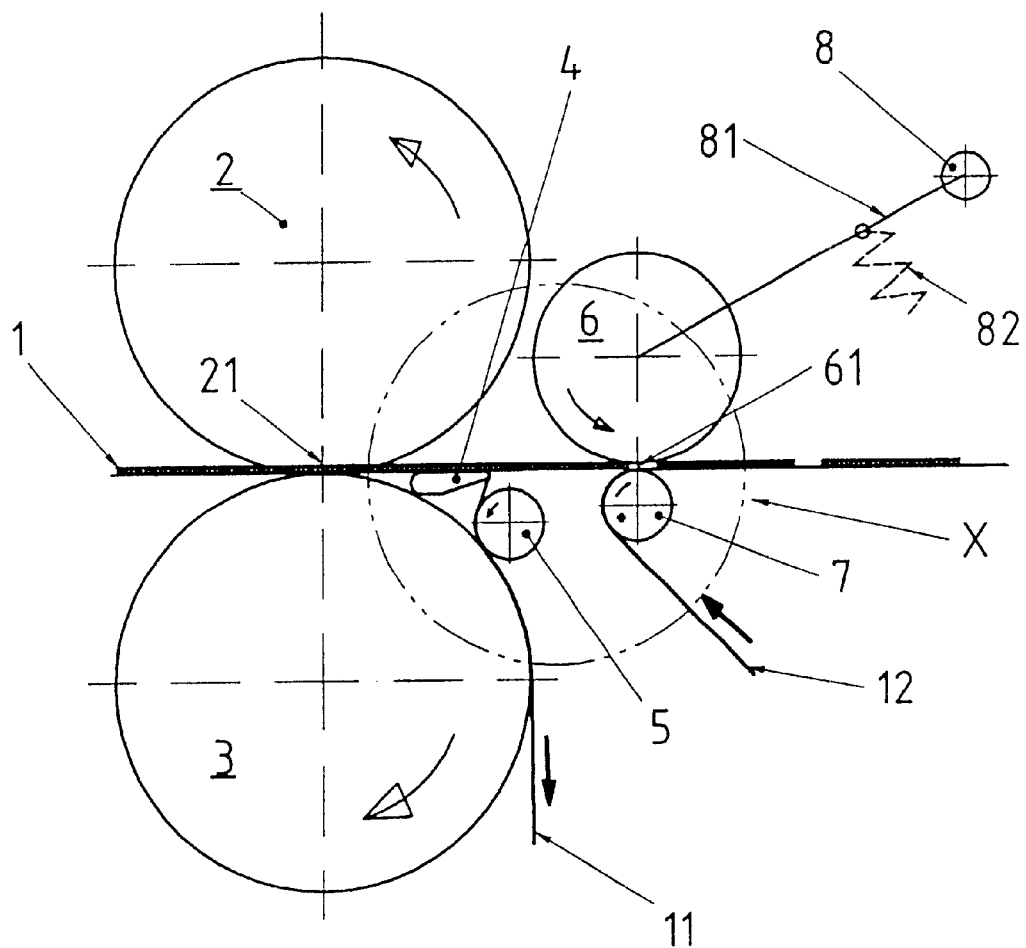
FIG. 1 shows the equipment necessary for implementing the method, a rotary cutting roller and a co-rotating counter-roller being provided as the punching device.

The direction of the cutting roller 2 and of the counter-roller 3 is given in each case by the marked arrows.

In the cutting line 21, the contours of the punched items 13, 14 are punched into the web 1 without the use of a punched screen. In this case punching takes place through to the lower release film 11.

Immediately after the cutting line 21 the lower release film 11 is peeled off by way of a dispensing edge 4, the release film 11 being guided first of all by way of a small roller 5 which causes the release film 11 to bear against the counter-roller 3. From the counter-roller 3, the release film 11 is fed to a winding apparatus, which is not shown here. The reel produced from the release film 11 can be employed again in the method.

Because of the small radius of deflection of the release film 11 at the dispensing edge 4, and because of the inertia of the punched items 13 and 14, following the removal of the release film 11 the punched items run straight on and run directly into a second roll nip 61 which is formed by two likewise co-rotating rollers 6 and 7. The rollers 6 and 7 always have a higher circumferential speed than the cutting roller 2 and the counter-roller 3. The upper roller 6 is connected by way of a device 81 to a suspension 8. By means of a spring 82 which engages on the device 81, it is possible to predetermine the pressure with which the roller 6 is pressed onto the lower roller 7.

In the roll nip 61, the second release film 12 is passed from below by way of the lower roller 7 onto the punched web 1. The higher speed of, for example, 47 m/min of the second release film 12 results in the punched items 13 and 14, becoming spaced apart from each other.

The ultimate spacing between the punched items 13 and 14 on the second release film 12 depends in this case on the difference in speed between the first release film 11 and the second release film 12. At the speeds indicated, a total of five punched items 13 and 14 are deposited with a width of 20 mm over a length of 95 mm, as illustrated, for example, in FIG. 4.

Figure 2:
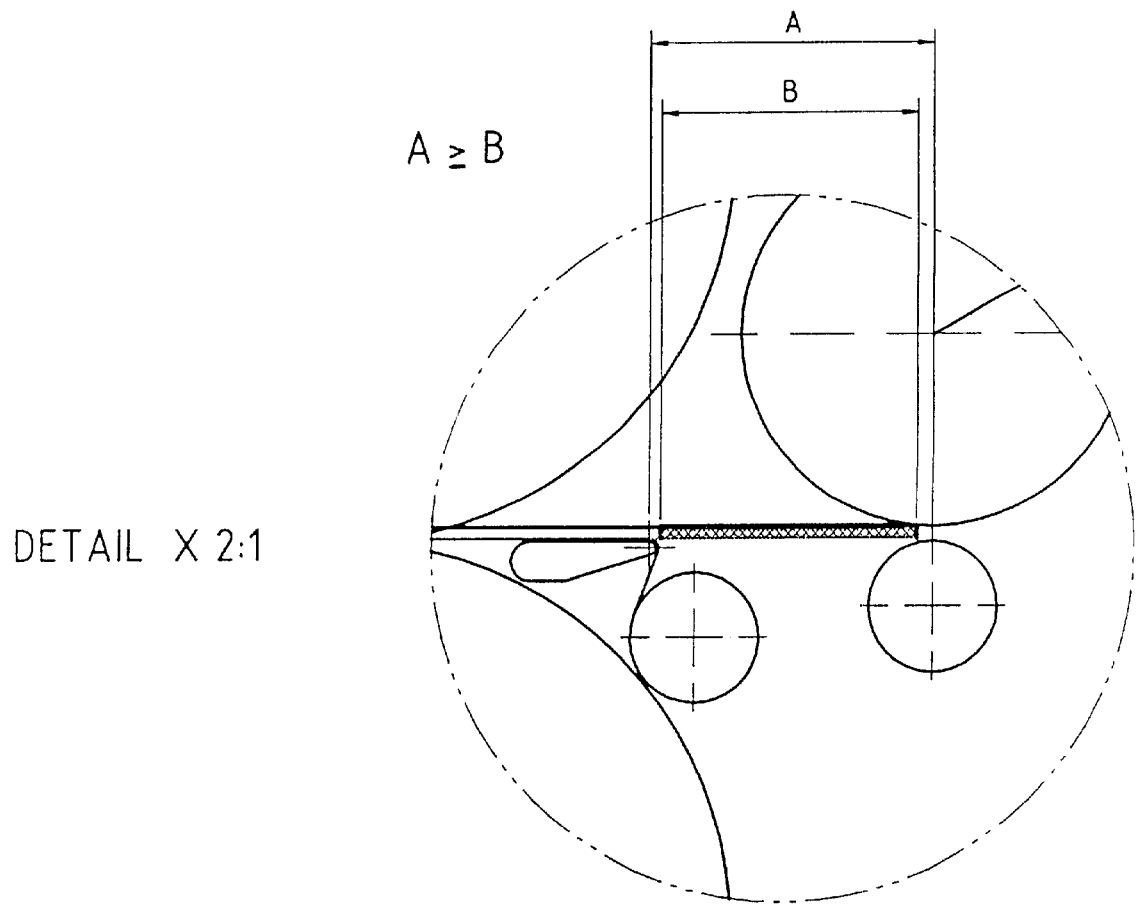
FIG. 2 shows an enlarged view of the encircled section of FIG. 1.

FIG. 2 shows an enlarged view of the circled section of FIG. 1. In this view, it can be seen that the distance A between the point where the punched item becomes detached from the first release laminate and the point where it becomes attached to the second release laminate is for example greater than the width B of the punched item.

Figure 3:
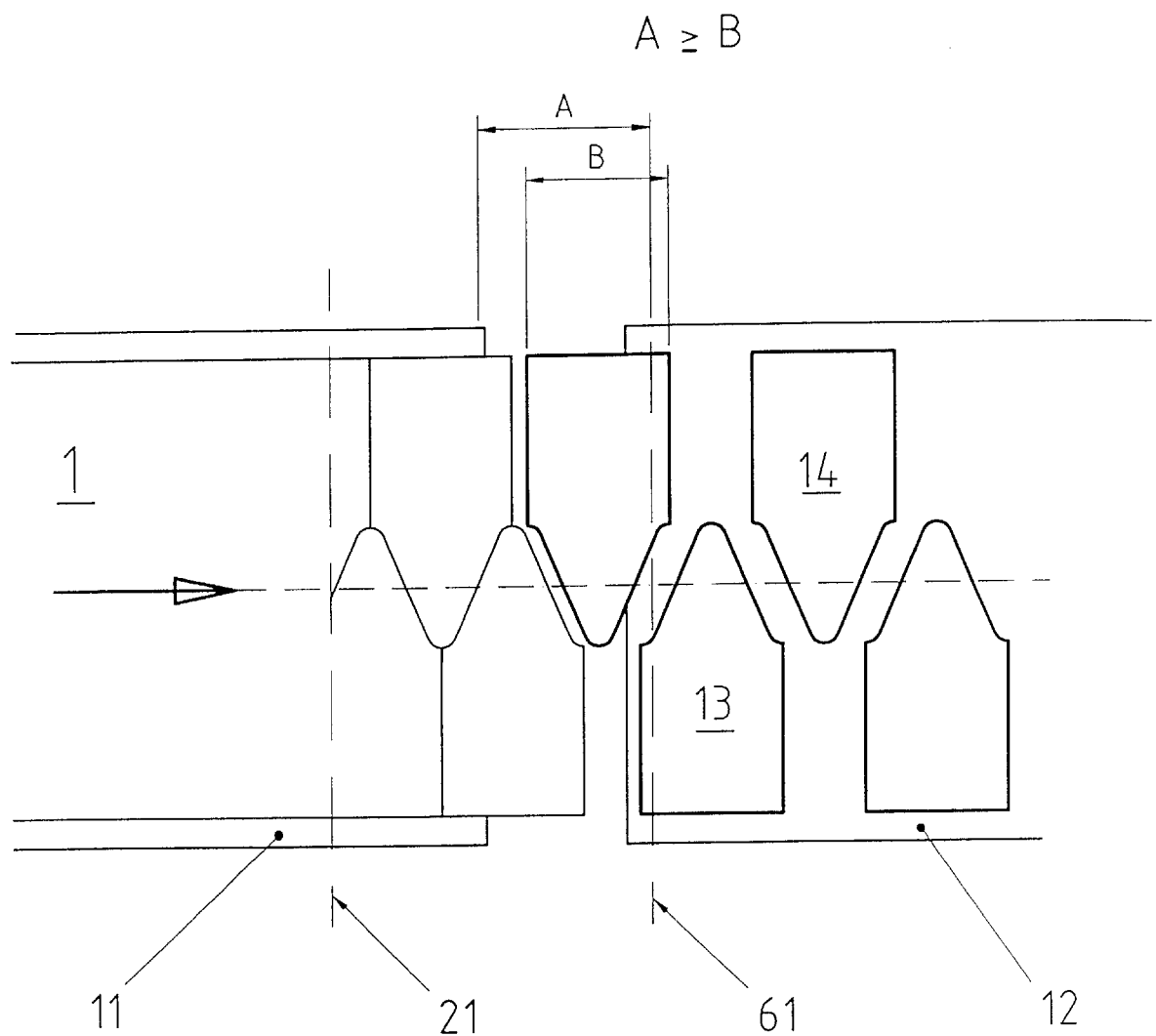
FIG. 3 shows the process of punching from the continuous web with the subsequent separation of the punched items, illustrated for the web plane.

FIG. 3 shows the method looking onto the web 1. The web 1 runs in the direction of the arrow on the first release film 11 into the cutting line 21. The punching operation takes place in the cutting line 21, with the contours of the punched items 13 and 14 being punched into the web 1. The first release film 11 is peeled off at the dispensing edge 4 and continues running straight on. In the second roll nip 61; firstly, the second release film 12 makes contact with the punched items and, secondly, the higher speed of the second release film 12 relative to the first release film 11 brings about separation of the punched items as illustrated by the distance between individual punched items 13 and 14. In this case, the first release laminate 11 and the second release laminate 12 are wider than the web 1.

Figure 4:
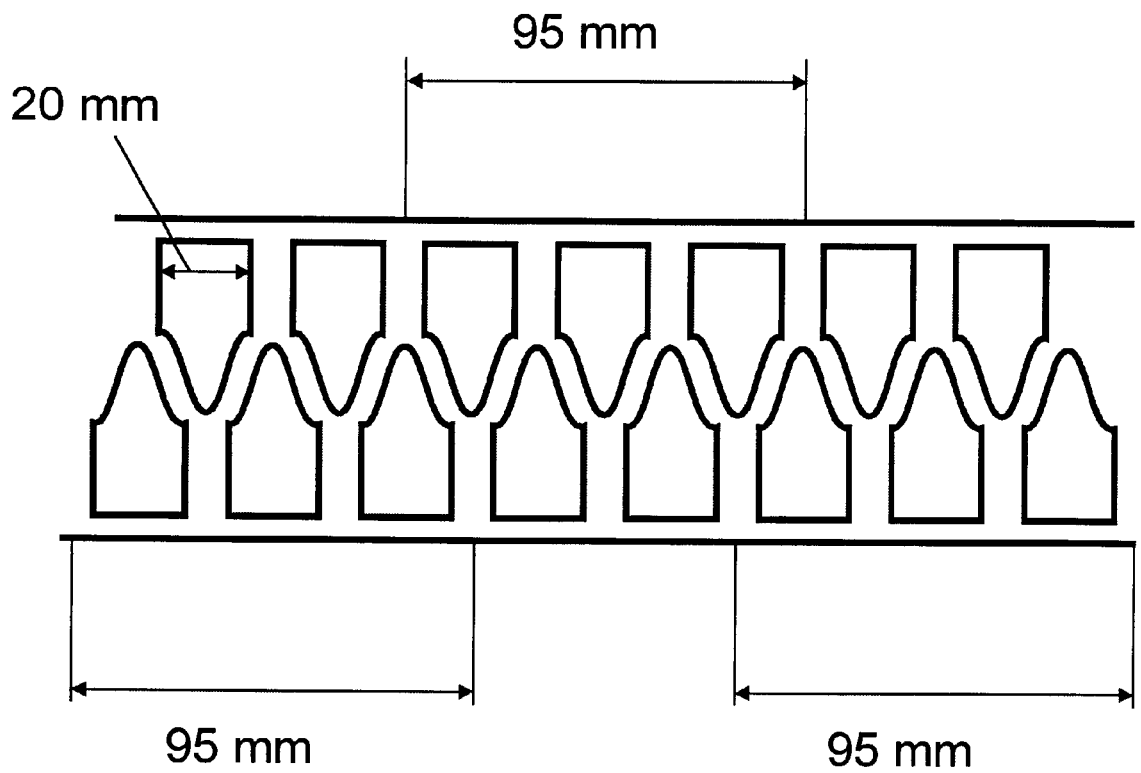
FIG. 4 shows a pattern of five punched items on the second release layer.

FIG. 4 shows the punched items on the second release layer. The individual punched items are spaced apart from each other due to the higher speed of the second release laminate relative to the speed of the first release laminate, on which the punched items were punched.

We claim:

1. Method of wasteless punching of adhesive punched items from a continuous web which is covered on at least one side with a first release laminate, wherein
    a) the web is passed into a punching device, the individual contours of the punched items being punched through in the web, without a punched screen, in the cutting line of the punching device,
    b) directly after the punching operation, the first release laminate is peeled off by means of a dispensing edge,
    c) subsequently, the individual punched items are applied to a second release laminate which has a higher belt speed than the first release laminate, the distance between the point where the punched items become filly detached from the first release laminate and the point where the punched items make contact with the second release laminate being equal to or greater than the width of said punched items in the longitudinal direction of the web, as a result of which there is separation of the punched items on the second release laminate.

2. Method according to claim 1, wherein the punching device is formed from a rotary cutting roller and a co-rotating counter-roller, the web being passed into the gap between the cutting roller and the counter-roller, and the first release laminate being passed by way of the counter-roller.

3. Method according to claim 1, wherein the punching device is formed by a lift punch into which the web is passed, and optionally a buffer is disposed between the lift punch and the dispensing edge.

4. Method according to claim 1, wherein the punched items are applied to the second release laminate in a gap between two co-rotating rollers.

5. Method according to claim 1, wherein the web is narrower than the first release laminate, the second release laminate or both.

6. Method according to claim 1, wherein the web is formed from a double-sided self-adhesive film which is based on thermoplastic rubber and tackifying resins.

7. Method according to claim 6, wherein the adhesive film is elastically or plastically extendable with or without an intermediate backing.

8. Method according to claim 1, wherein the adhesive punched items are single-sided adhesive labels.

* * * * *